(12) United States Patent
Umemoto et al.

(10) Patent No.: US 8,785,607 B2
(45) Date of Patent: *Jul. 22, 2014

(54) METHOD FOR MANUFACTURING WATER RESISTANT OPTICALLY ANISOTROPIC FILM, AND IMAGE DISPLAY DEVICE

(75) Inventors: Toru Umemoto, Osaka (JP); Tadayuki Kameyama, Osaka (JP)

(73) Assignee: Nitto Denko Corporation, Ibaraki-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/208,931

(22) Filed: Aug. 12, 2011

(65) Prior Publication Data

US 2012/0059157 A1    Mar. 8, 2012

(30) Foreign Application Priority Data

Sep. 8, 2010    (JP) .................. 2010-200488

(51) Int. Cl.
  *C09B 31/02*    (2006.01)
  *C09B 31/057*    (2006.01)

(52) U.S. Cl.
  USPC ......................................... 534/836

(58) Field of Classification Search
  USPC ......................................... 534/836
  See application file for complete search history.

(56) References Cited

U.S. PATENT DOCUMENTS

| | | | |
|---|---|---|---|
| 8,323,538 B2 * | 12/2012 | Ogomi et al. ............. | 264/1.31 |
| 8,491,823 B2 | 7/2013 | Miyazaki et al. | |
| 2006/0001808 A1 | 1/2006 | Shinohara | |
| 2007/0126983 A1 | 6/2007 | Godeau et al. | |
| 2009/0051058 A1 | 2/2009 | Ogomi et al. | |
| 2010/0314784 A1 | 12/2010 | Miyazaki et al. | |
| 2011/0134526 A1 | 6/2011 | Umemoto et al. | |

FOREIGN PATENT DOCUMENTS

| | | | |
|---|---|---|---|
| JP | 09-230142 A | | 9/1997 |
| JP | 11-021538 | * | 1/1999 |
| JP | 11-021538 A | | 1/1999 |
| JP | 2006-276236 A | | 10/2006 |
| JP | 2007-156464 A | | 6/2007 |
| JP | 2007-241267 A | | 9/2007 |
| JP | 2008-165200 A | | 7/2008 |
| JP | 2010-156937 A | | 7/2010 |
| WO | 2004/077131 A2 | | 9/2004 |
| WO | 2009/101849 A1 | | 8/2009 |

OTHER PUBLICATIONS

U.S. Appl. No. 13/706,724, Dec. 6, 2012.*
Japanese Office Action dated Aug. 22, 2013, issued in corresponding Japanese Patent Application No. 2010-200488, w/English translation.

* cited by examiner

*Primary Examiner* — Yong Chu
*Assistant Examiner* — Sonya Wright
(74) *Attorney, Agent, or Firm* — Westerman, Hattori, Daniels & Adrian, LLP

(57) ABSTRACT

The present invention relates to a method for manufacturing a water resistant optically anisotropic film comprising: a water resistant treatment step of bringing an optically anisotropic film containing an organic dye having an anionic group into contact with a water resistant treatment liquid containing a multivalent metal salt or a compound having two or more nitrogen atoms in a molecule thereof; and a cleaning step of cleaning the optically anisotropic film after the water resistant treatment, using a cleaning liquid containing a hydrophilic organic compound.

12 Claims, 1 Drawing Sheet

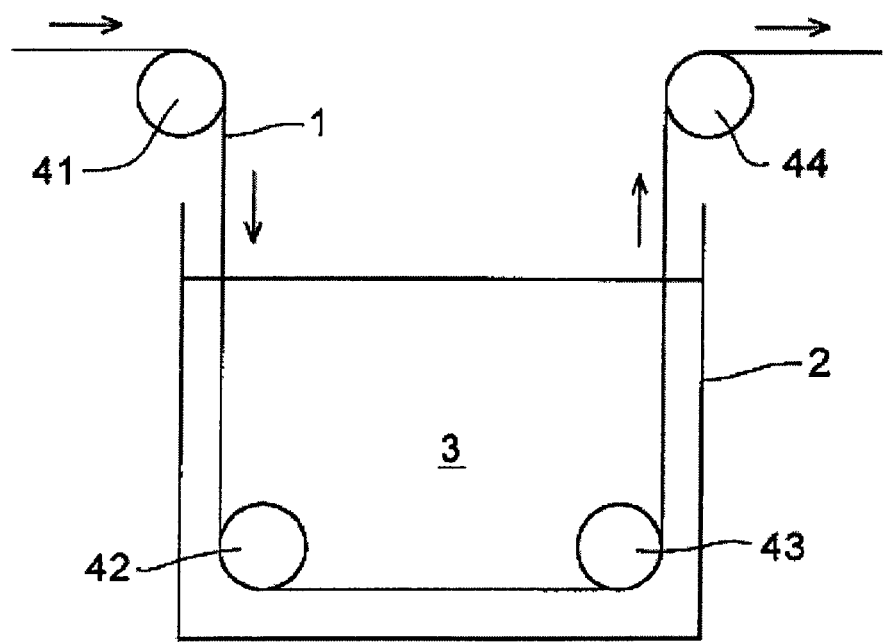

METHOD FOR MANUFACTURING WATER RESISTANT OPTICALLY ANISOTROPIC FILM, AND IMAGE DISPLAY DEVICE

TECHNICAL FIELD

The present invention relates to a method for manufacturing an optically anisotropic film with excellent water resistant properties.

BACKGROUND ART

There has hitherto been known an optically anisotropic film containing an organic dye having a sulfonic acid group.

This optically anisotropic film is obtained by coating a solution containing the foregoing organic dye and water on a base material, followed by drying.

The foregoing optically anisotropic film containing an organic dye having a sulfonic acid group is inferior in water resistant properties. For that reason, it is known that this film is subjected to a water resistant treatment.

Patent Documents 1 and 2 disclose that a film containing an organic dye having a sulfonic acid group is water-resistance processed by bringing it into contact with a solution containing a metal salt such as a barium salt.

In the water resistant treatment in each of Patent Documents 1 and 2, for the purpose of removing a metal salt remaining on the film after bringing the solution containing the metal salt into contact with the film, the surface of the film is cleaned with water.

However, when water is used as a cleaning liquid, there may be the case where a crack is generated in the film. Also, as described above, in the case where the film is formed on a base material, there is a concern that when water is used as a cleaning liquid, the film is partially separated from the base material.

Patent Document 1: JP-A-11-21538
Patent Document 2: JP-A-2007-241267

SUMMARY OF THE INVENTION

An object of the present invention is to provide a method for manufacturing a water resistant optically anisotropic film capable of suppressing the generation of a defect such as a crack.

The present inventors made extensive and intensive investigations regarding a cause of the generation of a crack in a film and conjectured that the cause is as follows.

The film water-resistance processed with a solution containing a metal salt as described above, is enhanced in its water resistant properties. However, the film contains an organic dye having a sulfonic acid group that is a polar group therein. For that reason, when the film is cleaned with water as conventional techniques, a water molecule is bonded to this sulfonic acid group, whereby water slightly penetrates into the film. When water that is the cleaning liquid penetrates into the film, the film is swollen, whereby the subject portion expands in a small convex state. Thereafter, when the film is dried for the purpose of removing the cleaning liquid, a part of the film contracts, and as a result, a crack is generated in the film.

Under such a conjecture, the present inventors have found that the foregoing object can be attained by the following means.

The present invention provides a method for manufacturing a water resistant optically anisotropic film comprising:

a water resistant treatment step of bringing an optically anisotropic film containing an organic dye having an anionic group into contact with a water resistant treatment liquid containing a multivalent metal salt or a compound having two or more nitrogen atoms in a molecule thereof; and a cleaning step of cleaning the optically anisotropic film after the water resistant treatment, using a cleaning liquid containing a hydrophilic organic compound.

The method for manufacturing a water resistant optically anisotropic film of the present invention is preferred that the cleaning liquid contains at least one hydrophilic organic compound and water, and the concentration of the whole hydrophilic organic compounds contained in the cleaning liquid is 10% by mass or more in total.

The method for manufacturing a water resistant optically anisotropic film of the present invention is preferred that the hydrophilic organic compound is an organic compound having at least one element selected from the group consisting of nitrogen atom and oxygen atom, in a molecule thereof.

The method for manufacturing a water resistant optically anisotropic film of the present invention is preferred that the hydrophilic organic compound is an alcohol or a ketone.

Another aspect of the present invention provides a water resistant optically anisotropic film obtained by the manufacturing method of the present invention.

Another aspect of the present invention provides an image display device comprising a water resistant optically anisotropic film obtained by the manufacturing method of the present invention.

According to the manufacturing method of the present invention, an optically anisotropic film which is free from a defect such as a crack can be obtained. Such an optically anisotropic film is excellent in water resistant properties because it has been subjected to a water resistant treatment. For example, by incorporating the optically anisotropic film with excellent water resistant properties according to the present invention into an image display device, it is possible to provide an image display device in which a display performance does not change over a long period of time.

BRIEF DESCRIPTION OF THE DRAWING

FIG. 1 is a referential side view illustrating a cleaning apparatus of an optically anisotropic film.

DESCRIPTION OF REFERENCE NUMERALS AND SIGNS

1 Multi-Layered Film
2 Cleaning bath
3 Cleaning liquid
41, 42, 43, and 44 Film conveying roller

Mode for Carrying out the Invention

[Summary of Manufacturing Method of Water Resistant Optically Anisotropic Film]

The manufacturing method of the present invention contains: a water resistant treatment step of bringing an optically anisotropic film containing an organic dye having an anionic group into contact with a water resistant treatment liquid containing a multivalent metal salt or a compound having two or more nitrogen atoms in a molecule thereof; and a cleaning step of cleaning the optically anisotropic film after the water resistant treatment, using a cleaning liquid containing a hydrophilic organic compound.

In general, a film-forming step of forming an optically anisotropic film is carried out prior to the water resistant treatment step.

In the manufacturing method of the present invention, a cleaning liquid containing a hydrophilic organic compound is used in the cleaning step. As compared with water, the hydrophilic organic compound has a low affinity for an organic dye having an anionic group. For that reason, the cleaning liquid hardly penetrates into the film when the film is cleaned with the cleaning liquid containing a hydrophilic organic compound. Therefore, according to the manufacturing method of the present invention, a water resistant optically anisotropic film free from a crack can be obtained. Also, when the optically anisotropic film is provided on the surface of a base material, the optically anisotropic film can be prevented from separating partially from the base material in the cleaning step. The manufacturing method of the present invention is described in detailed below.

Incidentally, in this specification, the phrase "from X to Y" means "X or more and not more than Y".

[Film-Forming Step]

The film-forming step is a step of obtaining an optically anisotropic film containing an organic dye having an anionic group.

In the film-forming step, an optically anisotropic film is obtained by: coating a coating solution containing an organic dye having an anionic group, onto a development surface to form a coating film containing the organic dye; and solidifying this coating film.

(Organic Dye Having an Anionic Group)

Though the organic dye used in the present invention is not particularly limited so far as it is an organic dye having an anionic group in a molecule thereof, it is preferably used an organic dye having two or more anionic groups. Examples of a basic structure of the organic dye include an azo based structure, a cyanine based structure, a merocyanine based structure, a perylene based structure and a naphthoquinone based structure. Above all, it is preferable to use an azo based organic dye in view of the fact that it exhibits favorable lyotropic liquid crystallinity.

Incidentally, the azo based organic dyes are organic dyes having one or more azo groups in a molecule thereof. Among these, it is preferable to use an azo based organic dye having two or more azo groups.

The anionic group has a fixed anion group bonded to a skeleton of the organic dye, and in general, a counter ion is bonded to the fixed anion group.

A part or the whole of the counter ion is substituted with a metal ion of a multivalent metal salt or a cation species of a compound having two or more nitrogen atoms.

Examples of the anionic group include a sulfonic acid group, a carboxyl group, a phosphoric acid group, a hydroxyl group and salt groups thereof. The anionic group is preferably a sulfonic acid group or a sulfonic acid salt group ($-SO_3M$ group), and more preferably a sulfonic acid salt group. Here, M represents a counter ion.

Though a number (substitution number) of the anionic group of the organic dye is not particularly limited, it is preferably 2 or more, more preferably from 2 to 5, and still more preferably from 2 to 4.

The organic dye having two or more anionic groups has a high affinity for an aqueous solvent. For this reason, the organic dye can be dissolved in the aqueous solvent, so that a favorable coating solution can be easily prepared. By using this coating solution, an optically anisotropic film with excellent orientation properties can be obtained.

It is considered that when subjected to a water resistant treatment, the organic dye having two or more anionic groups acts to generate plural cross-linking points together with the multivalent metal salt or compound having two or more nitrogen atoms. For this reason, the organic dye having two or more anionic groups can form a rigid supramolecule in which its orientation has little irregularity. When the organic dye having two or more anionic groups is used, an optically anisotropic film with excellent water resistant properties can be obtained.

Examples of the organic dye include compounds described in JP-A-2007-126628.

When the organic dye has two or more anionic groups, it is preferable that the substitution positions of the respective anionic groups are not adjacent to each other (not at the ortho-position). In particular, it is more preferable that the respective anionic groups are positioned at the meta-position. In the organic dye in which the anionic groups are positioned at the meta-position each other, a steric hindrance between the anionic groups is small. For this reason, the organic dye is easy to orient substantially linearly before and after the water resistant treatment.

The organic dye is preferably an azo compound represented by, for example, the following general formula (1-1), (1-2), (2-1) or (2-2).

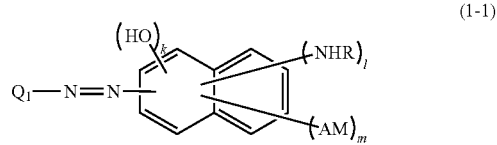

(1-1)

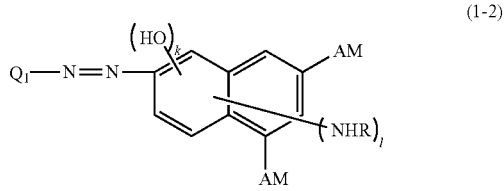

(1-2)

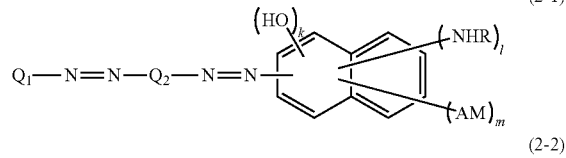

(2-1)

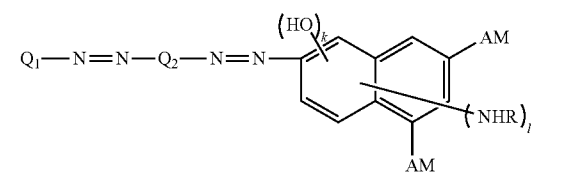

(2-2)

In the foregoing general formulae (1-1), (1-2), (2-1) and (2-2), $Q_1$ represents a substituted or unsubstituted aryl group; $Q_2$ represents a substituted or unsubstituted arylene group; A represents an anionic group; M represents a counter ion of the anionic group; R represents a hydrogen atom, a substituted or unsubstituted alkyl group, a substituted or unsubstituted acetyl group, a substituted or unsubstituted benzoyl group, or a substituted or unsubstituted phenyl group; k represents an integer of from 0 to 4; l represents an integer of from 0 to 4; and m represents an integer of from 1 to 6, provided that in the formulae (1-1) and (2-1), (k+l+m)≤7; and that in the formulae (1-2) and (2-2), (k+l)≤5. Incidentally, in this specification, the phrase "substituted or unsubstituted" means "substituted with a substituent or not substituted with a substituent".

The aryl group or arylene group represented by $Q_1$ or $Q_2$, respectively, may have a substituent or may have no substituent. In any case where the aryl group or arylene group represented by $Q_1$ or $Q_2$, respectively, is substituted or unsubstituted, the azo compounds represented by each of the foregoing general formulae exhibits absorption dichroism.

When the aryl group or arylene group has a substituent, examples of the substituent include a halogeno group, a nitro group, a cyano group, a dihydroxypropyl group, a phenylamino group, —OM, —COOM, —$SO_3M$, an alkyl group having from 1 to 6 carbon atoms, an alkoxy group having from 1 to 6 carbon atoms, an alkylamino group having from 1 to 6 carbon atoms and an acylamino group having from 1 to 6 carbon atoms. The substituent is preferably a nitro group or an anionic group such as an —$SO_3M$ group. Incidentally, M represents a counter ion.

Also, when the alkyl group, acetyl group, benzoyl group or phenyl group represented by R in the foregoing general formulae (1-1), (1-2), (2-1) and (2-2) has a substituent, examples of the substituent include the same substituents exemplified above for the aryl group or arylene group.

Examples of the alkyl group represented by R include an alkyl group having from 1 to 6 carbon atoms.

Examples of the aryl group include, in addition to a phenyl group, a condensed ring group in which benzene rings are condensed, such as a naphthyl group.

Examples of the arylene group include, in addition to a phenylene group, a condensed ring group in which benzene rings are condensed, such as a naphthylene group.

$Q_1$ in the foregoing general formulae (1-1), (1-2), (2-1) and (2-2) is preferably a substituted or unsubstituted phenyl group, more preferably a phenyl group having a substituent, and still more preferably a phenyl group having a substituent at least at the para-position.

$Q_2$ in the foregoing general formulae (2-1) and (2-2) is preferably a substituted or unsubstituted naphthylene group, and more preferably a substituted or unsubstituted 1,4-naphthylene group.

Also, examples of A in the foregoing general formulae (1-1), (1-2), (2-1) and (2-2) include a sulfonic acid group, a carboxyl group, a phosphoric acid group, hydroxyl group and salt groups thereof. A is preferably a sulfonic acid group or a sulfonic acid salt group, and more preferably a sulfonic acid salt group.

Examples of M in the foregoing general formulae (1-1), (1-2), (2-1) and (2-2) include a hydrogen ion, alkali metal ions, alkaline earth metal ions, other metal ions, an ammonium ion which may be substituted with an alkyl group or a hydroxyalkyl group, and salts of organic amines. Incidentally, after subjecting the optically anisotropic film containing at least one kind of the azo compounds represented by each of the foregoing general formulae to a water resistant treatment, a part or the whole of M in each of the foregoing general formulae becomes a cation species derived from the multivalent metal salt or compound having two or more nitrogen atoms contained in the water resistant treatment liquid.

R in the foregoing general formulae (1-1), (1-2), (2-1) and (2-2) is preferably a hydrogen atom or a substituted or unsubstituted alkyl group having from 1 to 4 carbon atoms, and more preferably a hydrogen atom.

Furthermore, k in the foregoing general formulae (1-1), (1-2), (2-1) and (2-2) is preferably an integer of from 0 to 2, and more preferably an integer of 1 or 2. l in the foregoing general formulae (1-1), (1-2), (2-1) and (2-2) is preferably an integer of from 0 to 2, and more preferably an integer of 0 or 1. m in the foregoing general formulae (1-1) and (2-1) is preferably an integer of from 1 to 4, and more preferably an integer of from 2 to 4.

The organic dye is more preferably an azo compound represented by the following general formula (2-3) or (2-4).

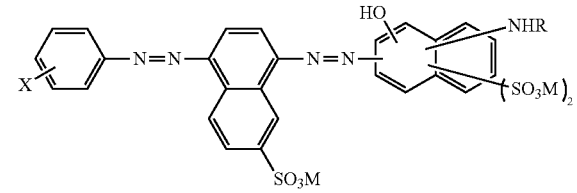

(2-3)

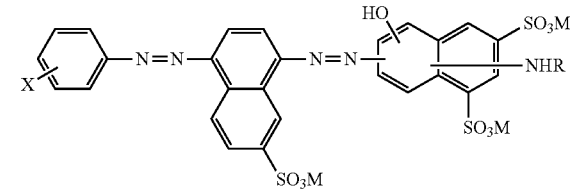

(2-4)

In the foregoing general formulae (2-3) and (2-4), X represents a hydrogen atom, a halogen atom, a nitro group, a cyano group; a substituted or unsubstituted alkyl group having from 1 to 4 carbon atoms, a substituted or unsubstituted alkoxy group having from 1 to 4 carbon atoms, or an —$SO_3M$ group.

R and M in the general formulae (2-3) and (2-4) are defined in the same manner as R and M in the foregoing general formula (2-1), respectively.

Incidentally, in X in the general formulae (2-3) and (2-4), when the alkyl group having from 1 to 4 carbon atoms or the alkoxy group having from 1 to 4 carbon atoms has a substituent, examples of the substituent include the same substituents exemplified above for the aryl group.

X in the foregoing formulae (2-3) and (2-4) is preferably a hydrogen atom, a nitro group or a cyano group, and more preferably a nitro group.

The organic dye such as the foregoing azo compound exhibits liquid crystallinity (lyotropic liquid crystallinity) in a state where it is dissolved in a solvent. Specifically, when dissolved in a solvent, the organic dye forms a supramolecule. When a liquid containing this organic dye is cast in a prescribed direction, a shear stress is applied to the supramolecule. As a result, a coating film in which the major axis of the supramolecule orients in the casting direction can be formed. The obtained coating film exhibits optical anisotropy because the organic dye orients in a prescribed direction.

The azo compound represented by each of the foregoing general formulae can be obtained by, for example, the following method. By subjecting an aniline derivative to diazotization and coupling reaction with a naphthalene sulfonic acid derivative in the usual way, a monoazo compound is obtained. Furthermore, by subjecting this monoazo compound to diazotization and then subjecting this to coupling reaction with an aminonaphtholdisulfonic acid derivative, a disazo compound is obtained.

(Coating Solution)

A coating solution is obtained by dissolving or dispersing the foregoing organic dye in an appropriate solvent. The organic dye may be used singly or in combinations of two or more kinds thereof.

In the coating solution, the organic dye forms a supramolecule in the solution, and as a result, a liquid crystal phase is exhibited. The liquid crystal phase is not particularly limited, and examples thereof include a nematic liquid crystal phase, a middle phase, a smectic liquid crystal phase, a cholesteric liquid crystal phase and a hexagonal liquid crystal phase. The liquid crystal phase can be confirmed and discriminated by its optical pattern which is observed by a polarizing microscope.

The foregoing solvent is not particularly limited, and conventionally known solvents can be used. Preferably, a solvent in which the organic dye is well soluble is useful. By using a coating solution in which the organic dye is well dissolved, the organic dye hardly precipitates at the time of film formation.

The solvent in which the organic dye is well soluble is, for example, an aqueous solvent.

Examples of the aqueous solvent include water, a hydrophilic solvent and a mixed solvent of water with a hydrophilic solvent. The hydrophilic solvent is a solvent capable of uniformly dissolving in water.

Examples of the hydrophilic solvent include alcohols such as methanol and ethanol; glycols such as ethylene glycol; cellosolves such as methyl cellosolve and ethyl cellosolve; ketones such as acetone; and esters such as ethyl acetate. The solvent is preferably water or a mixed solvent of water with a hydrophilic solvent.

It is preferable that a concentration of the organic dye in the coating solution is adjusted to the concentration at which a liquid crystal phase is exhibited. Specifically, the concentration of the organic dye is preferably from 0.5% by mass to 50% by mass. The coating solution is able to exhibit a liquid crystal phase in a part of the foregoing concentration range.

Further, the coating solution is prepared in such a manner that its pH is preferably from about 4 to 10, and more preferably from about 6 to 8.

Furthermore, the coating solution may contain one or two or more of additive. Examples of the additive include a plasticizer, a heat stabilizer, a light stabilizer, a lubricant, an antioxidant, an ultraviolet light absorber, a flame retardant, a coloring agent, an antistatic agent, an antimicrobial agent, a compatibilizing agent, a crosslinking agent, a thickener, and various polymers. A concentration of the whole additive in the coating solution is preferably more than 0% by mass and not more than 10% by mass in total. Also, the coating solution may contain a surfactant other organic dyes, arbitrary liquid crystalline compounds, or polymers.

(Formation of Optically Anisotropic Film)

By coating the coating solution on an appropriate development surface, a coating film can be formed.

The development surface is one for the purpose of substantially uniformly developing the coating solution. The kind of the development surface is not particularly limited so far as it is suited for this purpose. Examples of the development surface include a surface of a polymer film, a surface of a glass plate and a surface of a metallic drum. Also, an oriented film may be used as the polymer film. The oriented film has an orientation control force on its surface, and therefore, it is able to surely orient the organic dye.

As the development surface, a base material such as a polymer film and a glass plate is preferably used.

Though the polymer film is not particularly limited, it is preferably a film with excellent transparency (for example, its haze value is not more than 5%).

A thickness of the base material can be properly designed depending upon strength or the like. From the viewpoints of thinning and weight reduction, the thickness of the base material is preferably not more than 300 μm, more preferably from 5 μm to 200 μm, and still more preferably from 10 μm to 100 μm.

In general, a long base material is used in a mechanical manufacturing process. A length of the long base material is 10 m or more, and preferably 300 m or more.

The surface of the base material may have an orientation control force. The orientation control force can be introduced by subjecting the base material to an orientation treatment. Examples of the orientation treatment include a mechanical orientation treatment such as a rubbing treatment; and a chemical orientation treatment such as a light orientation treatment.

As a method for coating the coating solution on the development surface of a base material or the like, for example, a coating method using an adequate coater can be adopted.

When the coating solution in a liquid crystal phase state is coated on the development surface, a shear force is applied to a supramolecular association of the organic dye during the process. Therefore, a coating film in which the supramolecular association is oriented in a prescribed direction can be formed on the development surface.

Subsequently, the foregoing coating film is solidified. When an aqueous solvent is used as the solvent, the coating film is dried. As a method for drying the coating film, any of natural drying or forced drying may be adopted. A drying temperature is not higher than the isotropic phase transition temperature of the coating solution, and it is preferable that the temperature is elevated step by step from a low temperature to a high temperature. Specifically, the drying temperature is preferably from 10° C. to 80° C., and more preferably from 20° C. to 60° C. So far as the drying temperature falls within the foregoing range, a dry coating film with a small variation of thickness can be obtained.

A drying time can be properly set depending upon the drying temperature or the kind of the solvent. In the case of natural drying, the drying time is preferably from one second to 120 minutes, and more preferably from 10 seconds to 5 minutes.

The oriented organic dye is fixed in the drying process of the coating film. The coating film after drying is the optically anisotropic film.

A thickness of the obtained optically anisotropic film (dry coating film) is preferably from 0.1 μm to 10 μm.

[Water Resistant Treatment Step]

The water resistant treatment step is a step of imparting water resistant properties to the optically anisotropic film obtained in the foregoing film-forming step.

In the water resistant treatment step, the foregoing optically anisotropic film containing an organic dye is brought into contact with a water resistant treatment liquid.

(Water Resistant Treatment Liquid)

The water resistant treatment liquid contains a multivalent metal salt or a compound having two or more nitrogen atoms in a molecule thereof. The water resistant treatment liquid may contain one or two or more members selected from multivalent metal salts. The water resistant treatment liquid also may contain one or two or more members selected from compounds having two or more nitrogen atoms in a molecule thereof. Further, the water resistant treatment liquid may contain one or more members of the foregoing multivalent metal salt and one or more members of the foregoing compound having two or more nitrogen atoms in a molecule thereof.

The multivalent metal salt is not particularly limited so far as it is a water-soluble salt. Examples thereof include chlorides, sulfates, nitrates, phosphates, oxalates and acetates. Examples of a counter metal of the multivalent metal salt include barium, aluminum, lead, chromium, strontium, cerium, lanthanum, samarium, yttrium, copper and iron.

As the compound having two or more nitrogen atoms in a molecule thereof, an organic nitrogen compound having two or more nitrogen atoms can be used.

Though the number of nitrogen atom contained in the organic nitrogen compound is not particularly limited, it is preferably from 2 to 5, more preferably 2 or 3, and still more preferably 2. When the number of nitrogen atom in the organic nitrogen compound is more than 5, there is a concern that the crosslinking point with the anionic group of the organic dye becomes excessively complicated. When the crosslinking point becomes excessively complicated, there is a concern that the orientation of the organic dye becomes irregular, and therefore, optical characteristics of the optically anisotropic film are lowered. On the other hand, when the number of nitrogen atom in the organic nitrogen compound falls within the foregoing range, the organic dye can be firmly crosslinked without disordering the orientation while suppressing the matter that the crosslinking point with the organic dye becomes excessively large.

Furthermore, it is preferable that the organic nitrogen compound has an amino group, a guanidino group, an imino group, an ammonium group or a salt thereof.

Specific examples of the organic nitrogen compound include aliphatic diamines such as alkylene diamines, or salts thereof; aliphatic triamines such as alkylene triamines, or salts thereof; aliphatic tetramines such as alkylene tetramines, or salts thereof; aliphatic pentamines such as alkylene pentamines, or salts thereof; and aliphatic ether diamines such as alkylene ether diamines, or salts thereof. Such a non-cyclic organic nitrogen compound is preferably one with a carbon number of from 2 to 8.

Though the non-cyclic organic nitrogen compound may be either linear or branched, it is preferably linear. By using a linear organic nitrogen compound, an optically anisotropic film with more excellent mechanical strength can be obtained.

By dissolving or dispersing the foregoing multivalent metal salt or compound having two or more nitrogen atoms in a molecule thereof into an appropriate solvent, a water resistant treatment liquid can be obtained.

As the solvent, an aqueous solvent is preferably used. As the aqueous solvent, those exemplified above for the coating solution can be used.

A concentration of the multivalent metal salt or compound having two or more nitrogen atoms in a molecule thereof in the water resistant treatment liquid is preferably from 1% by mass to 50% by mass, and more preferably from 5% by mass to 20% by mass.

(Water Resistant Treatment)

By bringing the water resistant treatment liquid into contact with one surface or both surfaces of the foregoing optically anisotropic film, the water resistant optically anisotropic film of the present invention can be obtained.

A method for brining the water resistant treatment liquid into contact with the optically anisotropic film is not particularly limited. Examples of the contacting method include a method of coating the water resistant treatment liquid on the surface of the optically anisotropic film; and a method of dipping the optically anisotropic film into the water resistant treatment liquid. The coating of the water resistant treatment liquid can be carried out properly by using a coater, a spray or the like.

Above all, the method of dipping the optically anisotropic film into the water resistant treatment liquid is preferable. According to this method, the water resistant treatment liquid can be surely brought into contact with the whole of the optically anisotropic film. Also, according to this method, the water resistant treatment liquid is easy to penetrate into the optically anisotropic film, so that a large amount of the organic dye can be crosslinked via the multivalent metal salt or compound having two or more nitrogen atoms in a molecule thereof.

When the optically anisotropic film is brought into contact with the water resistant treatment liquid, the organic dyes in the optically anisotropic film are crosslinked with each other via a multivalent metal ion or a cationic group of the organic nitrogen compound. According to this crosslinking, an optically anisotropic film with excellent water resistant properties and mechanical strength is obtained.

[Cleaning Step]

The cleaning step is a step of cleaning the optically anisotropic film after the water resistant treatment, using a cleaning liquid containing a hydrophilic organic compound.

By performing the cleaning step, the water resistant treatment liquid remaining on the optically anisotropic film can be removed. Accordingly, it is possible to prevent precipitation of the multivalent metal salt or the like on the surface of the optically anisotropic film after the cleaning step from occurring.

As the hydrophilic organic compound, an organic compound having at least one of nitrogen atom and oxygen atom in a molecule thereof can be used, and also, an organic compound having a polar group in a molecule thereof can be used. The hydrophilic organic compound is preferably one which is in a liquid state at ordinary temperature ($20°$ C.$\pm 15°$ C.).

The foregoing polar group means a functional group with polarity. Examples of the polar group include functional groups containing oxygen atom and/or nitrogen atom with relatively large electronegativity.

Specific examples of the polar group include a hydroxyl group, an amino group, an amide group, an imino group, an imide group, a nitro group, a cyano group, an isocyanate group, a carboxyl group, an ester group, an ether group, a carbonyl group, and a sulfonic acid group.

Specific examples of the hydrophilic organic compound include linear or branched alcohols having from 1 to 8 carbon atoms, such as methanol, ethanol and isopropyl alcohol; ketones such as acetone and methyl ethyl ketone; glycols such as ethylene glycol; chain ethers such as methyl cellosolve and ethyl cellosolve; cyclic ethers such as tetrahydrofuran; amides such as formamide and N-dimethylformamide; sulfoxides such as dimethyl sulfoxide; nitriles such as acetonitrile; and esters such as ethyl acetate. Above all, alcohols and ketones are preferable.

The foregoing cleaning liquid may be constituted of only the hydrophilic organic compound. When the cleaning liquid is constituted of only the hydrophilic organic compound, the hydrophilic organic compound may be used singly or in admixture of two or more kinds thereof.

Also, the cleaning liquid may contain a mixed liquid of one or two or more members selected among the hydrophilic organic compounds and water.

It is preferable to use a cleaning liquid composed of a mixture of the hydrophilic organic compound and water. This preferred cleaning liquid contains water, so that it is able to efficiently remove the multivalent metal salt or the like remaining on the film. On the other hand, since the water compatibilized with the hydrophilic organic compound is lowered in its polarity, even when the cleaning liquid containing a hydrophilic organic compound and water is used, a considerable amount of water does not penetrate into the optically anisotropic film.

When the cleaning liquid contains at least one hydrophilic organic compound and water, a concentration of the whole hydrophilic organic compounds contained in the cleaning liquid is preferably 10% by mass or more, more preferably 20% by mass or more, and further preferably 40% by mass or more in total.

On the other hand, when the cleaning liquid contains at least one hydrophilic organic compound and water, an upper limit of the concentration of the whole hydrophilic organic compounds is less than 100% by mass, preferably not more than 95% by mass, and more preferably not more than 90% by mass in total.

When the content of the hydrophilic organic compound is too small, the polarity of water is not sufficiently lowered, so that there is a concern that a considerable amount of water penetrates into the optically anisotropic film.

A method for cleaning the optically anisotropic film with the foregoing cleaning liquid is not particularly limited.

Examples of the method include: (a) a method of spraying the cleaning liquid onto the surface of the optically anisotropic film; (b) a method of dipping the optically anisotropic film into a bath in which the cleaning liquid flows in a prescribed direction; and (c) a method of allowing the optically anisotropic film to pass through a cleaning bath filled with the cleaning liquid.

When the optically anisotropic film is formed on a long base material, as shown in FIG. 1, it is preferable that the optically anisotropic film delivered in a manufacturing line is cleaned by allowing this film to pass through a cleaning bath filled with a cleaning liquid.

FIG. 1 is a referential side view of a cleaning apparatus provided on the way of the manufacturing line of the optically anisotropic film. In FIG. 1, the numeral 1 stands for a multilayered film in which a long base material and an optically anisotropic film are laminated; the numeral 2 stands for a cleaning bath filled with a cleaning liquid; the numeral 3 stands for a cleaning liquid; each of 41, 42, 43 and 44 stands for a film conveying roller; and an arrow stands for a delivery direction of the laminated film.

Though a temperature of the cleaning liquid is not particularly limited, it is in general from 20° C. to 50° C. Though a time for exposing the optically anisotropic film to the cleaning liquid is not particularly limited, it is in general from about 1 to 20 minutes.

After cleaning, in order to remove the cleaning liquid remaining on the surface of the optically anisotropic film, this film is allowed to be dried.

As a method for drying the film, any of natural drying or forced drying may be adopted. Though a drying temperature is not particularly limited, it is in general from 20° C. to 60° C. As to a drying time, the drying may be performed until the surface of the film dries up.

By cleaning the optically anisotropic film using the foregoing cleaning liquid, the water resistant treatment liquid remaining on the optically anisotropic film can be removed.

As compared with water, the hydrophilic organic compound contained in the cleaning liquid has a low affinity for the organic dye having an anionic group, so that the cleaning liquid hardly penetrates into the optically anisotropic film. Therefore, the generation of a crack on the optically anisotropic film after cleaning can be suppressed. Furthermore, the optically anisotropic film after cleaning is not partially separated from the base material.

When the optically anisotropic film is cleaned with only water as in the conventional techniques, a defect such as generation of a crack or separation from a base material is caused on the optically anisotropic film due to the penetration of water into the film. According to the present invention, it is possible to suppress the generation of such a defect.

Furthermore, the optically anisotropic film of the present invention has excellent water resistant properties and mechanical strength because the organic dye is crosslinked via the multivalent metal salt or the like.

[Composition and Various Characteristics of Optically Anisotropic Film]

Though a content of the foregoing organic dye in the optically anisotropic film of the present invention is not particularly limited, it is preferably 80% by mass or more and less than 100% by mass, and more preferably 90% by mass or more and less than 100% by mass relative to the total mass of the film.

Further, in addition to the foregoing organic dye, other component may be contained in the optically anisotropic film of the present invention.

Examples of the other component include other organic dyes (organic dyes other than the organic dye having an anionic group), various additives, arbitrary liquid crystalline compounds, and polymers.

Also, though a thickness of the foregoing optically anisotropic film is not particularly limited, it is preferably from 0.1 µm to 10 µm. When the thickness of the optically anisotropic film is less than 1 µm, in order to secure self-supporting properties, the optically anisotropic film may be used in a state where it is laminated on a base material.

When an organic dye having absorption capacity in a visible light region is used, the optically anisotropic film containing the subject organic dye can be utilized as a polarizing film. When an organic dye which does not substantially have absorption capacity or has small absorption capacity in a visible light region is used, the optically anisotropic film containing the subject organic dye can be utilized as a retardation film.

When the optically anisotropic film of the present invention is a polarizing film, it exhibits absorption dichroism at a wavelength of at least a part of a visible light region (wavelength: from 380 nm to 780 nm). A transmittance of this optically anisotropic film is 35% or more, preferably 36% or more, and more preferably 37% or more. A degree of polarization thereof is 95% or more, and preferably 98% or more.

[Application of Optically Anisotropic Film]

The optically anisotropic film of the present invention can be used as a polarizing plate upon being, for example, laminated with a protective film on one surface or both surfaces thereof.

The optically anisotropic film obtained by the manufacturing method of the present invention can be used in a state where it is laminated on a base material, or can be used upon being peeled away from the base material.

Incidentally, when the optically anisotropic film is used in a state where it is laminated on the base material, the base material can be utilized as a protective film.

Also, the optically anisotropic film of the present invention is preferably incorporated into an image display device.

Examples of the image display device having the optically anisotropic film of the present invention include a liquid crystal display device, an organic EL display device, and a plasma display device. A preferred application of the image display device is a television receiver.

EXAMPLES

The present invention is described in detail with reference to the following Examples and Comparative Examples. Incidentally, it should not be construed that the present invention is limited only to the following Examples. Respective measurement methods used in the Examples and Comparative Examples are as follows.

[Observation Method of Liquid Crystal Phase]

A small amount of a coating solution was interposed between two slide glasses, and a liquid crystal phase thereof was observed using a polarizing microscope (trade name: OPTIPHOT-POL, manufactured by Olympus Corporation).

[Measurement Method of Thickness of Optically Anisotropic Film]

As to a thickness of an optically anisotropic film, after an optically anisotropic film was formed on a polymer film, a part of the optically anisotropic film was peeled away from the polymer film, and a difference in level between the polymer film and the optically anisotropic film was measured using a three-dimensional contactless-type surface shape measuring system (trade name: MICROMAP MM5200, manufactured by Ryoka Systems Inc.).

[Evaluation Method of Defect of Optically Anisotropic Film]

As to a laminate of an optically anisotropic film and polymer film after cleaning, the whole of the surface of its optically anisotropic film was visually observed, thereby confirming whether or not a precipitate attached to the surface.

Subsequently, this laminate was placed on an observation stage of a polarizing microscope (trade name: OPTIPHOT-POL, manufactured by Olympus Corporation), and the surface of the optically anisotropic film was observed with a magnification of 100, thereby confirming whether or not a crack or separation was generated in the film. At the same time, whether or not a precipitate was generated on the surface of the optically anisotropic film magnified by the microscope was again confirmed.

Example 1

4-Nitroaniline and 8-amino-2-naphthalene sulfonic acid were subjected to diazotization and coupling reaction in the usual manner (Yutaka HOSODA, Riron Seizo Senryo Kagaku (Theoretical Production Dye Chemistry), Fifth Edition, published on Jul. 15, 1968 by Gihodo Shuppan Co., Ltd., pages 135 to 152), thereby obtaining a monoazo compound. The obtained monoazo compound was subjected to diazotization and further subjected to coupling reaction with lithium 1-amino-8-naphthol-2,4-disulfonate in the above-described usual manner, thereby obtaining a crude product. This crude product was subjected to salting-out with lithium chloride to obtain a disazo compound represented by the following structural formula (3).

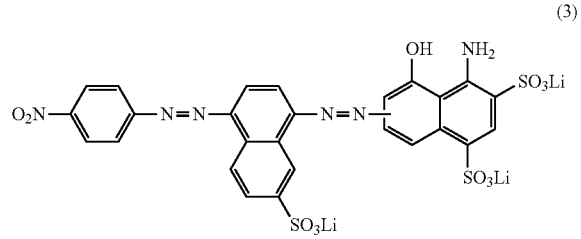

(3)

The disazo compound represented by the foregoing formula (3) was dissolved in ion-exchanged water to prepare a 20% by mass coating solution. This coating solution had a pH of 7.8.

This coating solution was collected by a poly dropper and observed at room temperature (23° C.) according to the foregoing evaluation method of a liquid crystal phase. As a result, the foregoing coating solution exhibited a nematic liquid crystal phase.

The foregoing coating solution was coated on a norbornene-based polymer film (trade name: ZEONOR, manufactured by Zeon Corporation), which had been subjected to rubbing treatment and corona treatment, using a bar coater (trade name: Mayer rot HS4, manufactured by Bushman Corporation), and thoroughly naturally dried in a thermostatic chamber at 23° C. The dry coating film formed on the foregoing polymer film by drying is an optically anisotropic film. The foregoing optically anisotropic film had a thickness of 0.4 μm.

1,3-Propanediamine hydrochloride (manufactured by Sigma-Aldrich Co.) and bis(hexamethylene)triamine hydrochloride (manufactured by Sigma-Aldrich Co.) were blended in a proportion of 80/20 in terms of a mass ratio and mixed with ion-exchanged water, thereby preparing a 10% by mass water resistant treatment liquid.

The foregoing laminate made of a polymer film and an optically anisotropic film was subjected to a water resistant treatment upon being dipped into this water resistant treatment liquid for about one minute.

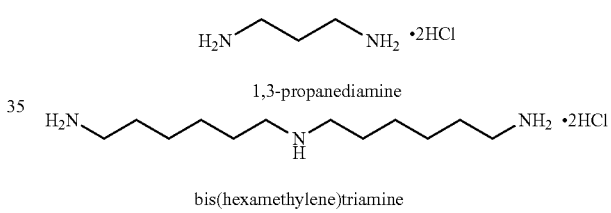

Separately, isopropyl alcohol and water were mixed in a proportion of 90/10 in terms of a mass ratio, thereby preparing a cleaning liquid, and a bath tank thoroughly filled with this cleaning liquid was prepared.

Then, after taking out the foregoing laminate from the foregoing water resistant treatment liquid, for the purpose of washing away the excessive water resistant treatment liquid attached to this laminate, the laminate was dipped into the foregoing bath tank filled with the cleaning liquid for about one minute. Subsequently, after taking out the laminate from this bath, the cleaning liquid attached to the front and back surfaces of the laminate was blown away using an air blower, thereby thoroughly air-drying the laminate.

As to the laminate after cleaning, the presence or absence of a crack, separation and precipitate was observed according to the foregoing evaluation method of a defect of the optically anisotropic film. As a result, the optically anisotropic film of Example 1 was free from the generation of a defect such as a crack or separation.

Also, a precipitate was not generated on the surface of the optically anisotropic film.

Example 2

A water resistant optically anisotropic film was prepared in the same manner as in the foregoing Example 1, except that a cleaning liquid obtained by mixing isopropyl alcohol and water in a proportion of 50/50 in terms of a mass ratio was used in place of the cleaning liquid of Example 1.

This optically anisotropic film was observed in the same manner as in Example 1. As a result, not only a defect such as a crack was not generated, but also a precipitate was not generated.

Example 3

A water resistant optically anisotropic film was prepared in the same manner as in the foregoing Example 1, except that a cleaning liquid obtained by mixing isopropyl alcohol and water in a proportion of 20/80 in terms of a mass ratio was used in place of the cleaning liquid of Example 1.

This optically anisotropic film was observed in the same manner as in Example 1. As a result, not only a defect such as a crack was not generated, but also a precipitate was not generated.

Example 4

A water resistant optically anisotropic film was prepared in the same manner as in the foregoing Example 1, except that a cleaning liquid obtained by mixing acetone and water in a proportion of 50/50 in terms of a mass ratio was used in place of the cleaning liquid of Example 1.

This optically anisotropic film was observed in the same manner as in Example 1. As a result, not only a defect such as a crack was not generated, but also a precipitate was not generated.

Example 5

A water resistant optically anisotropic film was prepared in the same manner as in the foregoing Example 1, except that a cleaning liquid composed of only isopropyl alcohol was used in place of the cleaning liquid of Example 1.

This optically anisotropic film was observed in the same manner as in Example 1. As a result, a defect such as a crack was not generated. Also, a precipitate to be caused due to the components of the water resistant treatment liquid was slightly generated on the surface of the optically anisotropic film.

Comparative Example 1

A water resistant optically anisotropic film was prepared in the same manner as in the foregoing Example 1, except that a cleaning liquid obtained by mixing isopropyl alcohol and water in a proportion of 5/95 in terms of a mass ratio was used in place of the cleaning liquid of Example 1.

This optically anisotropic film was observed in the same manner as in Example 1. As a result, a crack and separation was partially generated. Also, a precipitate was not generated on the surface of the optically anisotropic film.

Comparative Example 2

A water resistant optically anisotropic film was prepared in the same manner as in the foregoing Example 1, except that a cleaning liquid composed of only water was used in place of the cleaning liquid of Example 1.

This optically anisotropic film was observed in the same manner as in Example 1. As a result, a crack and separation was partially generated. Also, a precipitate was not generated on the surface of the optically anisotropic film.

Comparative Example 3

A water resistant optically anisotropic film was prepared in the same manner as in the foregoing Example 1, except that a cleaning liquid composed of only toluene was used in place of the cleaning liquid of Example 1.

This optically anisotropic film was observed in the same manner as in Example 1. As a result, though a defect such as a crack was not generated, a large amount of a precipitate to be caused due to the components of the water resistant treatment liquid was generated on the surface of the optically anisotropic film.

TABLE 1

| | Cleaning liquid | Presence or absence of defect | Presence or absence of precipitate |
|---|---|---|---|
| Ex. 1 | isopropyl alcohol/water = 90/10 | Absent | Absent |
| Ex. 2 | isopropyl alcohol/water = 50/50 | Absent | Absent |
| Ex. 3 | isopropyl alcohol/water = 20/80 | Absent | Absent |
| Ex. 4 | acetone/water = 50/50 | Absent | Absent |
| Ex. 5 | only isopropyl alcohol | Absent | Slightly present |
| Comp. Ex. 1 | isopropyl alcohol/water = 5/95 | Present | Absent |
| Comp. Ex. 2 | only water | Present | Absent |
| Comp. Ex. 3 | only toluene | Absent | Present |

[Evaluation]

By using a cleaning liquid containing a hydrophilic organic compound as in Examples 1 to 5, optically anisotropic films which are free from a defect such as a crack were obtained. Also, while the cleaning liquid of Example 5 was composed of only a hydrophilic organic compound, in the case of this cleaning liquid, a precipitate was slightly confirmed. Therefore, it was noted that when a mixed liquid of a hydrophilic organic compound and water is used as the cleaning liquid, the generation of a defect of the film or the generation of a precipitate can be surely suppressed. Furthermore, even in the case of using a mixed liquid of a hydrophilic organic compound and water as the cleaning liquid, it was noted that when water is contained in a high proportion in the cleaning liquid as in Comparative Example 1, the generation of a defect of the film cannot be sufficiently suppressed. Therefore, it can be conjectured from comparison between Example 3 and Comparative Example 1 that when a cleaning liquid containing 10% by mass or more of a hydrophilic organic compound is used, the generation of a defect of the film or the generation of a precipitate can be suppressed.

While the present invention has been described in detail and with reference to the specific embodiments thereof, it will be apparent to one skilled in the art that various changes and modifications can be made therein without departing from the spirit and scope thereof.

The present application is based on Japanese Patent Application No. 2010-200488 filed on Sep. 8, 2010, and the entire contents are incorporated herein by reference. All references cited herein are incorporated in their entirety.

Industrial Applicability

The manufacturing method of an optically anisotropic film of the present invention can be suitably utilized at the manufacture of an optically anisotropic film with excellent water resistant properties.

The optically anisotropic film obtained by the manufacturing method of the present invention can be utilized for image display devices such as liquid crystal display devices, polarizing sunglasses, and so on.

What is claimed is:

1. A method for manufacturing a water resistant optically anisotropic film comprising:
    bringing an optically anisotropic film containing an organic dye having an anionic group into contact with a water resistant treatment liquid containing a multivalent metal salt or a compound having two or more nitrogen atoms in a molecule thereof and
    cleaning the optically anisotropic film after the water resistant treatment, using a cleaning liquid consisting of water and at least one hydrophilic organic compound.

2. The method for manufacturing a water resistant optically anisotropic film according to claim 1,
    wherein the cleaning liquid contains at least one hydrophilic organic compound and water, and the concentration of the whole hydrophilic organic compounds contained in the cleaning liquid is 10% by mass or more in total.

3. The method for manufacturing a water resistant optically anisotropic film according to claim 1,
    wherein the hydrophilic organic compound is an organic compound having at least one element selected from the group consisting of nitrogen atom and oxygen atom, in a molecule thereof.

4. The method for manufacturing a water resistant optically anisotropic film according to claim 1,
    wherein the hydrophilic organic compound is an alcohol or a ketone.

5. The method for manufacturing a water resistant optically anisotropic film according to claim 1, wherein the organic dye exhibits lyotropic liquid crystallinity in a state where it is dissolved in a solvent.

6. The method for manufacturing a water resistant optically anisotropic film according to claim 1, wherein the organic dye is an azo compound represented by formulae (1-1), (1-2), (2-1), (2-2), 2-3 or 2-4:

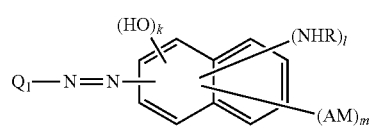
(1-1)

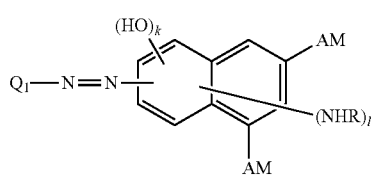
(1-2)

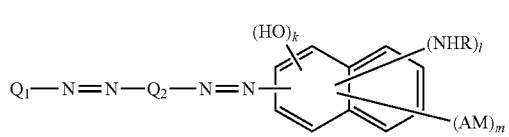
(2-1)

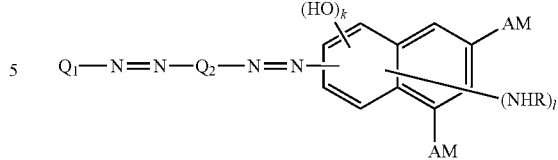
(2-2)

wherein $Q_1$ represents a substituted or unsubstituted aryl group; $Q_2$ represents a substituted or unsubstituted arylene group; A represents an anionic group; M represents a counter ion of the anionic group; R represents a hydrogen atom, a substituted or unsubstituted alkyl group, a substituted or unsubstituted acetyl group, a substituted or unsubstituted benzoyl group, or a substituted or unsubstituted phenyl group; k represents an integer of from 0 to 4; l represents an integer of from 0 to 4; and m represents an integer of from 1 to 6, provided that in the formulae (1-1) and (2-1), (k+l+m)≤7; and provided that in the formulae (1-2) and (2-2), (k+l)≤5;

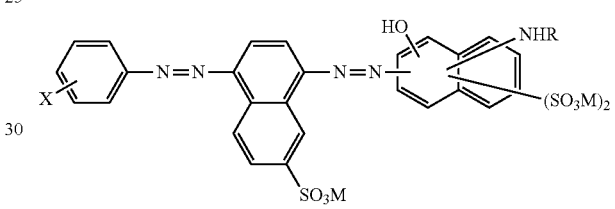
(2-3)

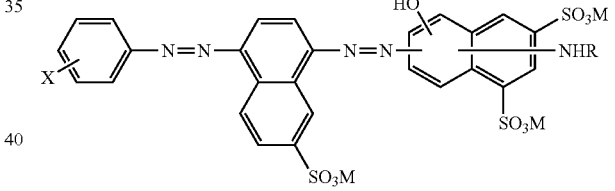
(2-4)

wherein X represents a hydrogen atom, a halogen atom, a nitro group, a cyano group, a substituted or unsubstituted alkyl group having from 1 to 4 carbon atoms, a substituted or unsubstituted alkoxy group having from 1 to 4 carbon atoms, or an —SO$_3$M group; M represents a counter ion of the anionic group; and R represents a hydrogen atom, a substituted or unsubstituted alkyl group, a substituted or unsubstituted acetyl group, a substituted or unsubstituted benzoyl group, or a substituted or unsubstituted phenyl group.

7. The method for manufacturing a water resistant optically anisotropic film according to claim 1, wherein the multivalent metal salt is a water-soluble salt.

8. The method for manufacturing a water resistant optically anisotropic film according to claim 1, wherein the multivalent metal salt is selected from the group consisting of chlorides, sulfates, nitrates, phosphates, oxalates and acetates.

9. The method for manufacturing a water resistant optically anisotropic film according to claim 1, wherein the multivalent metal salt comprises a counter ion selected from the group consisting of barium, aluminum, lead, chromium, strontium, cerium, lanthanum, samarium, yttrium, copper and iron.

10. The method for manufacturing a water resistant optically anisotropic film according to claim 1, wherein the hydrophilic organic compound is an organic compound having at least one nitrogen atom in a molecule thereof and is selected from the group consisting of an amino group, a guanidino group, an imino group, and an ammonium group, or a salt thereof.

11. The method for manufacturing a water resistant optically anisotropic film according to claim 1, therein the compound having two or more nitrogen atoms is selected from the group consisting of 1,3-Propanediamine hydrochloride and bis(hexamethylene)triamine hydrochloride.

12. The method for manufacturing a water resistant optically anisotropic film according to claim 1, wherein bringing the optically anisotropic film into contact with the water resistant treatment liquid is by dipping the optically anisotropic film into the water resistant treatment liquid.

* * * * *